United States Patent

[11] 3,544,729

[72] Inventor Thomas R. Stevens
Reynoldsburg, Ohio
[21] Appl. No. 737,923
[22] Filed June 18, 1968
[45] Patented Dec. 1, 1970
[73] Assignee Bell Telephone Laboratories, Incorporated
Murray Hill, New Jersey
a corporation of New York

[54] SWITCHING SYSTEM ARRANGEMENT FOR TERMINATING A CALL TO A LINE OTHER THAN A CALLED LINE
13 Claims, 12 Drawing Figs.

[52] U.S. Cl. 179/18
[51] Int. Cl. H04m 3/54
[50] Field of Search 179/18.03

[56] References Cited
UNITED STATES PATENTS
3,377,433 4/1968 Whitney 179/18

*Primary Examiner*—Kathleen H. Claffy
*Assistant Examiner*—Douglas W. Olms
*Attorney*—R. J. Guenther and James Warren Falk

ABSTRACT: A switching system is arranged to transfer calls incoming to selected subscriber lines to any other telephone location arbitrarily preselected by the called subscriber. Control circuitry including a central memory is utilized to inhibit the completion of a call to a line which is to be afforded transfer service and to establish an alternate connection to the preselected other telephone location via an idle auxiliary switching circuit which is not directly associated with the originally called line. The called subscriber's line remains free at all times for the origination of outgoing calls; for the concurrent transfer of all incoming calls; and for the receipt of an audible announcement indicating that a transfer is in progress and the directory number of the transfer line.

INVENTOR
T. R. STEVENS
BY Brendan A. Ward
ATTORNEY

SWITCHING SYSTEM ARRANGEMENT FOR TERMINATING A CALL TO A LINE OTHER THAN A CALLED LINE

BACKGROUND OF THE INVENTION

1. Field of the Invention

This invention relates generally to telephone switching systems and more particularly to switching network arrangements within such systems wherein calls directed to a particular subscriber are inhibited and completed instead to some other arbitrarily preselected telephone station for a selected interval of time.

2. Description of the Prior Art

Extensive development of telephone switching systems in recent years has made possible the provision of numerous special features which render telephone service more convenient and more flexible. For example, circuit arrangements have been provided whereby a special service subscriber, who is to be absent from his telephone for some temporary period of time, may have incoming calls diverted to some other telephone station during such absence.

A most recent example of such a temporary transfer system is disclosed in W. Whitney U.S. Pat. No. 3,377,433, dated Apr. 9, 1968. The Whitney patent, although a substantial contribution to prior art system arrangements, highlights the deficiency of the existing art in the area of special service systems. The Whitney disclosure teaches a temporary transfer system arranged whereby an auxiliary circuit is interposed between the calling station and the called station on each calling connection. In Whitney, as in other prior special service systems, the flexibility of the system is curtailed because of the connection which is always made to the called line when the system is activated. No provision has been made for situations where, during a transfer interval, it is desired to originate calls from the special service station; or to have more than one incoming call concurrently transferred to another station; or to provide an announcement to the special service subscriber as an indication that a call is currently being transferred and to also provide the number to which the call is being directed.

A specific example of the desirability of a system where, while a call is in progress, the called line remains free for the origination of outgoing calls and for the concurrent transfer of all incoming calls is the communication requirements of physicians. Calls incoming to a physician's office whenever the physician is unavailable should be directed to another physician or to an answering bureau in order to provide prompt medical attention at all times. Concurrent with this requirement, the office staff must utilize the telephone for a variety of purposes, such as for returning calls and for making appointments with patients. However, in prior art systems, when the physician is not in the office, but is available at some other telephone station, patients, who would otherwise receive prompt medical attention if calls were completed to the transfer station irrespective of whether the office telephone was busy, instead receive busy signals. No provision is made for the situation where the transfer station is an answering bureau, or other similar service with multiple answering facilities. Immediate assistance is therefore not obtained by a patient when a previous call to the physician's telephone is currently being transferred to the bureau notwithstanding that the answering bureau is equipped to concurrently handle many such calls.

The importance of an announcement feature where a station which is arranged for call transfer is notified whenever a call is transferred and the directory number of the transfer station can be appreciated readily when, as is usually the case, more than one party routinely utilizes such a telephone station. In prior art systems, the party initiating the transfer function frequently does not inform the others that calls are currently being transferred and the directory number to which the calls are being diverted. In such a situation, confusion results in that the called subscriber's telephone rings simultaneously with the establishment of a call to a third party, thereby possibly resulting in an undesired and extremely confusing three-way conversation.

In view of the foregoing, an object of this invention is to provide a temporary call transfer switching arrangement which may be simply and economically implemented in existing systems so as to obviate a connection to the called subscriber's line whenever the transfer function is activated.

A further object is to provide a temporary call transfer switching network easily controllable by a subscriber so as to concurrently direct all calls incoming to that subscriber to some other subscriber station.

A still further object is to provide a switching system whereby a subscriber may originate calls during periods when incoming calls to his line are being directed to some other subscriber.

A still further object is to provide a special service switching network which transmits an audible announcement to a called station indicating the activation of a special service function.

SUMMARY OF THE INVENTION

These and other objects are obtained in accordance with an exemplary embodiment of the invention wherein a number of subscriber stations are provided with a special service feature known as call transfer. A plurality of auxiliary call transfer line circuits are also provided but in significantly lesser quantities than the aforesaid subscriber stations. Each such auxiliary circuit has two appearances, an A appearance and a B appearance on the line side of the central office switching network. A central memory associated with the switching system is arranged with a plurality of address locations each exclusively associated with a station served by the system and each addressable by the line equipment location of the respective station.

The proposed switching system is arranged to screen all incoming calls to determine whether the called line has requested transfer service. Upon determination that a particular call is to be transferred, the incoming trunk, which would normally be connected to the called subscriber's line, is connected instead to the line link frame A appearance of an idle auxiliary transfer circuit which is not associated physically with the called line. The connection of the incoming trunk to the transfer circuit causes the B appearance of that circuit to initiate a dial tone request in the well-known manner. A connection is thereby established through the switching network from the transfer circuit to an originating register. However, instead of receiving dialed digits from the originating station through the established connection the register receives a previously stored transfer number directly from the central memory. The call is then completed to the transfer station in the same manner as though it had originated in the originally called subscriber's office. Communication is thereby possible from the calling station to the transfer station via the auxiliary transfer circuit.

In accordance with one feature of my invention, a special services switching network is arranged to concurrently transfer all calls incoming to a called station to some other preselected station.

In accordance with another feature of my invention, a switching system is arranged whereby a subscriber may have incoming calls automatically forwarded to any arbitrarily selected telephone station for a selected interval of time while the subscriber's station remains available at all times for the origination of outgoing calls.

In accordance with another feature of my invention, a switching network is arranged to recognize the special status of a called line and to divert calls incoming to that line to an auxiliary transfer circuit not associated with the called line and to thereafter record in a central memory the association of the transfer circuit with the called line.

In accordance with still another feature of my invention, a switching network is arranged to recognize the special status of a called line so as to divert incoming calls to a transfer station and to thereupon connect an audible announcement circuit to the called line as an indication to the called subscriber that a call is currently being transferred and the directory number of the transfer station to which the call is being diverted.

DESCRIPTION OF THE DRAWING

The foregoing objects, features and advantages, as well as others of the invention, will be more apparent from the following description of the drawing in which.

It will be noted that FIGS. 2 through 11 employ a type of notation referred to as "detached contact" in which an X shown intersecting a conductor represents a normally open contact of a relay and a bar shown intersecting a conductor at right angles represents a normally closed contact of a relay; "-normally" referring to the unoperated condition of the relay. The principles of this type of notation are described in an article entitled "An Improved Detached Contact Type Schematic Circuit Drawing" by F. T. Meyer in the Sept. 1955 publication of the American Institute of the Electrical Engineers Transactions, Communications and Electronics, Vol. 74, pages 505—513."

Figure 5:
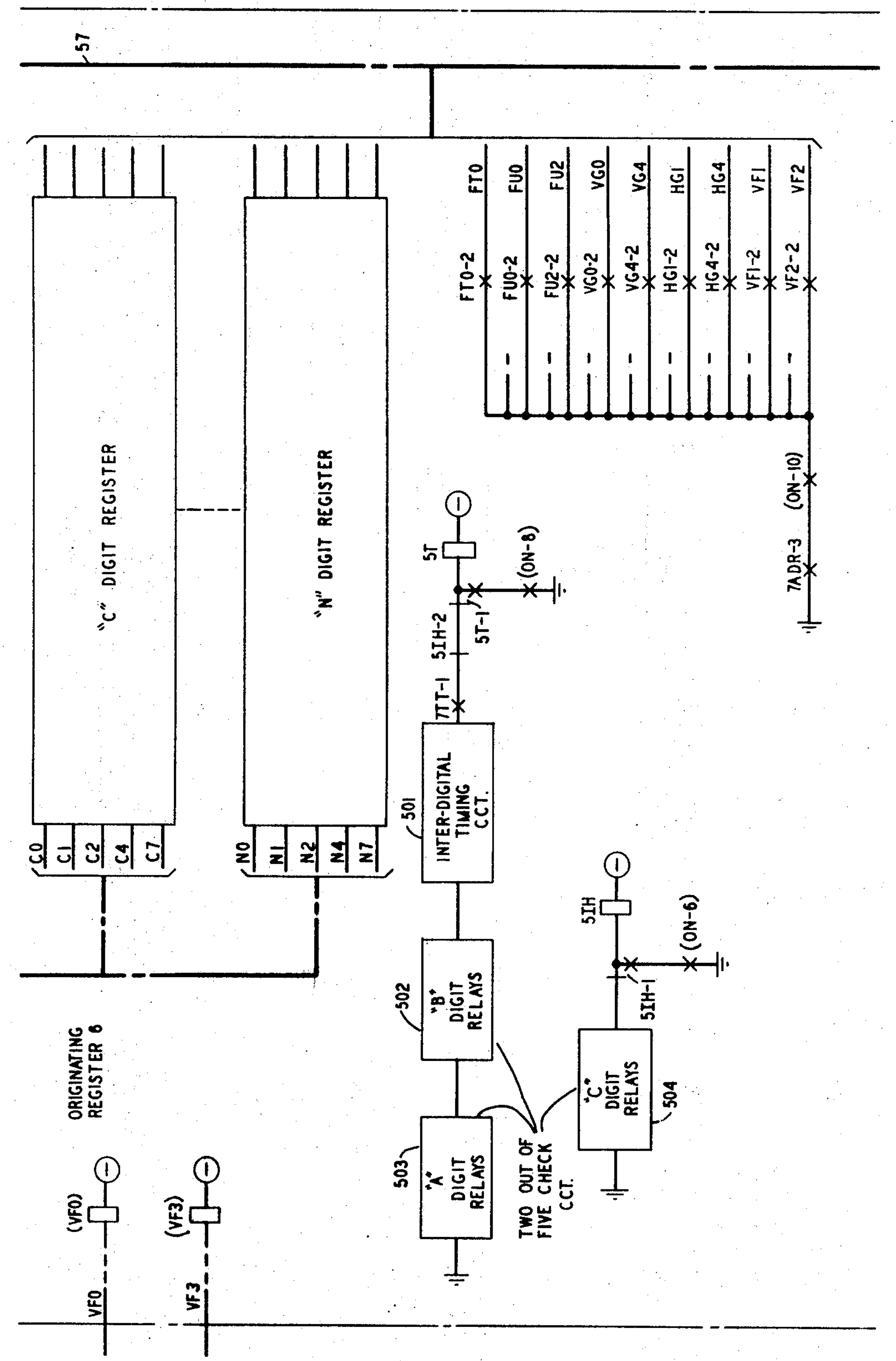

It will also be noted that in order to simplify the disclosure and thus facilitate a more complete understanding of the embodiment, the relays, relay contacts and other electromechanical devices shown in FIGS. 2 through 11 have been given systematic designations. Thus, the number preceding the letters of each device corresponds to the figure in which the control circuit of the device is shown. Thus, the coil of relay 5T is shown in FIG. 5. Each relay contact, either make, break or transfer, is shown with its specific contact number preceded by the designation of the relay to which it belongs. For example, the notation 5T-1 indicates contact number 1 of relay 5T, the coil of which is shown in FIG. 5.

INTRODUCTION

The present invention is illustrated in an automatic switching system wherein common control circuits are employed to control the establishment of calls through a switching network. One such system is disclosed in the A. J. Busch U.S. Pat. No. 2,585,904, dated Feb. 19, 1952. It is to be understood that the present invention is not, however, limited to use in a telephone system of this type but may be utilized in other types of switching systems.

The invention is described herein as being embodied in a telephone system of the type disclosed in the cited Busch patent. The invention is particularly concerned with apparatus in marker circuit 8, in originating register 6, call transfer switching circuit 12 and memory 7 which are represented by the blocks shown with heavy lines in FIG. 1. The other equipment units of the Busch system are neither shown nor described in detail herein except where necessary for a complete understanding of the invention. The cited Busch patent may be consulted for a complete understanding of the construction and operation of other components of the Busch disclosure.

For purposes of illustration, it is intended that the apparatus of line link frame (LLF) 2, trunk link frame (TLF) 3, incoming trunks 4 and 14, outgoing trunks 5 and 13, originating register 6, line link marker connecter 9, line link frame connecter 15, trunk link frame connecter 17, number group 11 and marker 8 be similar to the corresponding apparatus disclosed in the Busch patent. It is also intended that the apparatus of automatic message accounting (AMA) equipment 10 be substantially identical to that disclosed in H. D. Cahill et al. U.S. Pat. No. 2,599,358, dated June 3, 1952. It is further intended that memory circuit 7 may constitute any one of a number of configurations well known in the art operable to electrically record information in binary form at preselected address locations, each of which address locations is effective to provide the information stored therein on a nondestructive readout basis.

Figure 1:
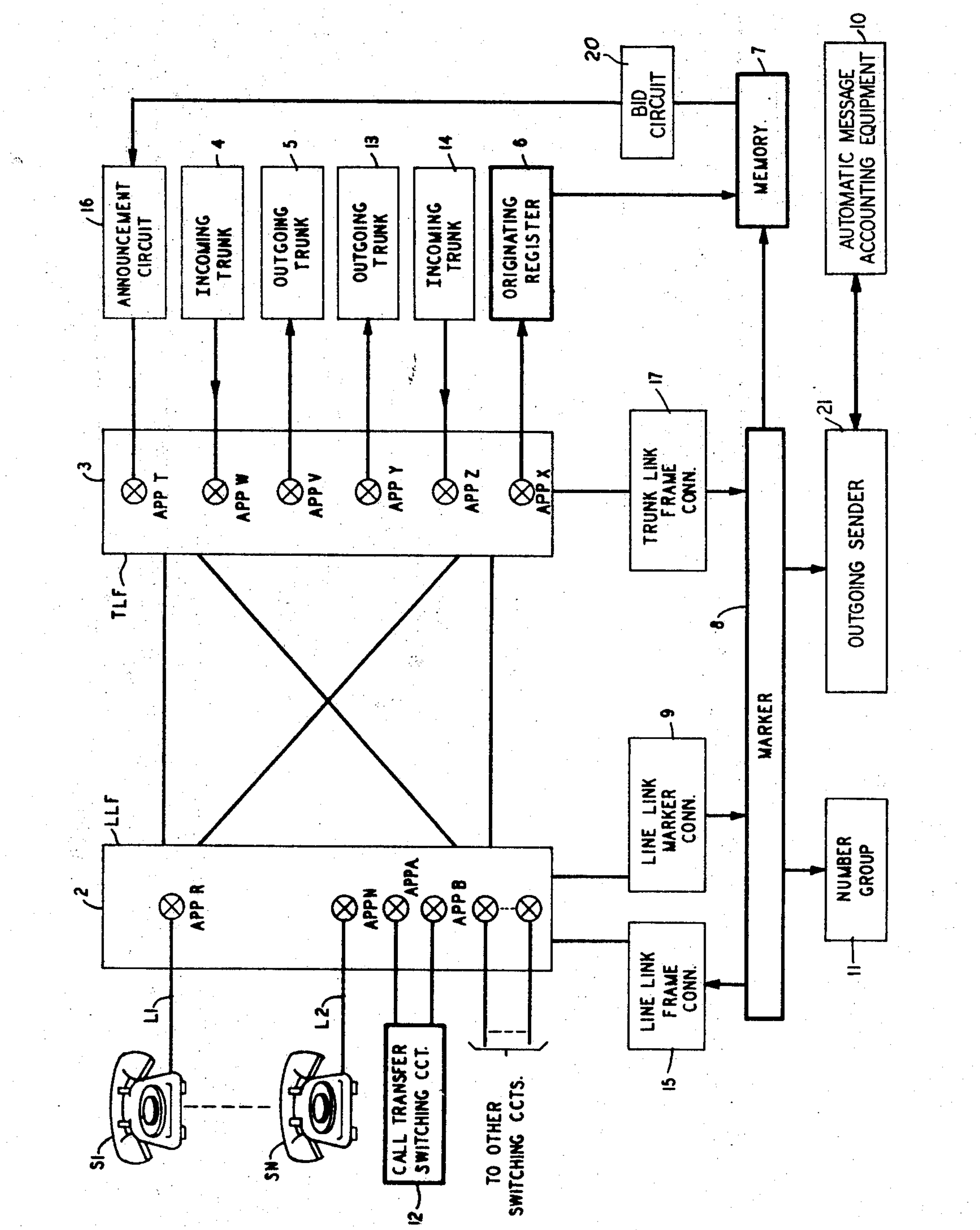
FIG. 1 is essentially a block diagram showing the interrelation of the exemplary embodiment of the invention.

In order to further facilitate an understanding of the invention, the description of the operation of the exemplary embodiment has been subdivided into a general description portion designated 1.00 and a detailed description portion designated 2.00 Section 1.00 and its subsections describe the invention in general terms with respect to FIG. 1. Section 2.00 and its subsections describe the invention in detail with respect to FIGS. 2 through 11.

1.00 General Description

The interrelation and function of the equipment units of the exemplary embodiment will now be described with reference to FIG. 1 wherein the interconnection between circuit blocks has been designated by arrows to indicate the direction of circuit action.

For purposes of illustration, we shall assume that a subscriber at station S1 anticipates a need to utilize the call transfer feature which is available to that station. We shall also assume that the station to which the call is to be transferred is located at a point not served by the same switching center. However, as will be more apparent from that which is contained hereinafter, the transfer station may be advantageously located at any switching center, including the switching center serving station S1.

1.1 Establishment of a Transfer Number in Memory

Referring now to FIG. 1, when station S1 goes off-hook, marker circuit 8 is arranged, as described in the aforementioned Busch patent, to connect line link frame appearance R with trunk link frame appearance X in the normal manner such that digits transmitted from station S1 will be received in originating register circuit 6. As further set forth in the Busch patent, marker circuit 8 then causes the registration of the class of service and the calling line equipment location of station S1 in the originating register. The marker thereupon releases from the connection.

Dial tone is returned to subscriber station S1 from originating register 6, in the well known manner, upon completion of the aforesaid linkage. At this point we shall assume that the subscriber at station S1 has knowledge of a special code which signifies to the originating register, in a manner to be more fully set forth hereinafter, that the digits which will follow are to be stored in memory for future use as a transfer number. For purposes of illustration, we shall further assume that the code which initiates the call transfer feature is 11. It should be noted at this point that the originating register may be arranged to accept any other combination of digits as an identification code. Accordingly, upon receipt of dial tone from originating register 6, a subscriber at station S1 dials (or key pulses) the digits 1 and 1 into the register. As will be more apparent from that which is contained hereinafter, originating register 6 is arranged to return second dial tone to station S1 a predetermined interval of time after the registration of this two-digit code. Accordingly, upon receipt of the second dial tone the subscriber at station S1 transmits the digits corresponding to the directory numbers of the transfer station. Upon receipt of these digits the originating register seizes memory circuit 7 in the manner to be more fully described hereinafter.

At this point it should be noted that the originating register contains the line equipment location of station S1 together with the directory number of the transfer party. Accordingly, the originating register utilizes the equipment location number of station S1 as an address to provide access to a specific physical location within memory circuit 7. At this particular physical location the transfer station's identification number is stored under control of the originating register 6. Upon completion of the memory storage procedure, the register releases memory 7. As will be more apparent from that which is contained hereinafter, originating register 6 also releases at this time. We shall assume for purposes of simplicity that the subscriber at station S1 now returns the subset to an on-hook condition.

Digressing momentarily, it should be pointed out that originating register 6 may be arranged to complete the call forward to the transfer station prior to the storage of the transfer station's directory number in memory. Such an arrangement would be advantageous when it is desired to check the transfer station to ascertain whether the transfer party is available to receive calls. However, in order to simplify the disclosure and thus facilitate an understanding of the invention, it will be assumed that the transfer number is stored in memory 7 immediately upon receipt from subscriber station S1.

Returning now to FIG. 1, upon the release of originating register 6 the subscriber at station S1 is free to place outgoing calls in the normal manner However, as will be apparent from that which follows, incoming calls to station S1 will be diverted to the transfer station.

1.2 Incoming Call Diverted to an Auxiliary Line Switching Circuit

We shall assume at this point that incoming trunk circuit 4 is activated by an incoming call which is directed to station S1. As set forth in detail in the Busch patent, when marker 8 receives the called line information, number group circuit 11 is interrogated so as to determine the line equipment information and ringing combination of the called party. In the instant case, upon so doing, the marker is arranged to recognize the privileged status of the called station from its preassigned ringing combination. To impart this information to the marker, the preassignment of a specified ringing combination may be utilized, as herein set forth. However, it will be obvious from that which is contained hereinafter that numerous other techniques may be employed. For example, an additional translation indication may be returned by the number group in the manner set forth in T. V. Burns et al. U.S. Pat. No. 3,264, 415, dated Aug. 2, 1966.

Proceeding now with the description, in view of the special service status of station S1, the marker 8 is arranged, as will be detailed hereinafter, to interrogate memory 7 to ascertain whether station S1 currently has a transfer number stored therein. For this purpose the marker utilizes the called line equipment location, as returned by the number group, as an address for the memory. Since the line equipment location associated with station S1 has a transfer number stored thereat in memory, the marker is arranged to hunt, in the well-known manner, for an idle call transfer switching circuit, such as switching circuit 12. Upon ascertaining the idle status of such a circuit, the marker thereupon, in a manner to be detailed hereinafter, causes the equipment location of the A line appearance of the selected switching circuit to be written into memory 7 at the address location of the called line. Memory 7 thereupon causes marker 8 to release the line equipment location information of the called line stored in the marker and substitutes therefor the line equipment location of the A appearance of the selected switching circuit. Marker 8 then completes the call, in the well-known manner, from incoming trunk 4, appearance W on the trunk link frame 3, through the switching network to appearance A of the selected switching circuit. On completion of this connection ringing takes place in the well-known manner as described in detail in the Busch patent.

Digressing again momentarily, the failure of memory 7 to indicate that a transfer number is presently stored therein corresponding to the equipment location of the called line would result in the marker completing the call in the normal manner to the called station S1.

Returning now to FIG. 1, it is apparent that the incoming call has been diverted from the line appearance of station S1 and completed instead to the A line appearance of an auxiliary circuit. It should be noted that since the marker did not check the line appearance of station S1 for a busy condition prior to completing the call to the auxiliary circuit the transfer function will proceed irrespective of whether the called station is busy or not.

1.3 Audible Announcement to the Called Line

The marker, upon storing the auxiliary switching circuit line appearance number is arranged to enable the seizure of an idle announcement circuit, such as announcement circuit 16. The seized announcement circuit thereupon bids for a completing marker and a connection is established through the switching network to the called station S1. When the subscriber at the station S1 removes the handset, an indication will be transmitted from the auxiliary circuit to the called station that a call is presently being transferred. This indication may be in the form of an audible announcement which may also provide the directory number of the transfer station to which the call is presently being diverted. As will become more apparent from the detailed description, whenever a special service subscriber is unavailable or whenever the called line is busy, the announcement circuit will time out and release.

1.4 Completion of a Call from the Auxiliary Circuit to the Transfer Station

As previously set forth, upon establishment of a linkage from the incoming trunk to the auxiliary circuit, ringing tone is applied to the line. The auxiliary circuit is arranged to immediately detect this ringing potential and to trip ringing, in the manner to be more fully described hereinafter, so as to cause appearance B to appear as an off-hook condition to line link frame 2. Accordingly, line link frame 2 calls in marker 8 via line link marker connecter 9. Marker 8 thereupon connects appearance B of call transfer switching circuit 12 to originating register 6 in the manner previously discussed, and as set forth in the aforementioned Busch patent for originating calls. The marker thereupon releases from the connection.

The class of service assigned to appearance B of call transfer switching circuit 12 indicates, as will be more apparent from that which is to follow, to originating register 6 that digits will not be received in the normal manner but rather that memory 7 must be consulted to process the call further. The originating register 6 thereupon addresses the memory 7 with the equipment location number of the B appearance of the switching circuit 12. The memory, in a manner to be more fully detailed hereinafter, is arranged to correlate the equipment location of appearance B with the equipment location of appearance A. It should be noted at this point that such a correlation is possible since the A and B appearance locations of each transfer circuit do not vary.

Upon determining the A appearance equipment location of the switching circuit, the memory 7 is again arranged to correlate this information with the associated called line equipment location. It will be remembered that such an association was made in the memory when the incoming trunk was connected to the A appearance of the switching circuit. Once the called line equipment location is established, the memory 7 transfers to the originating register 6 the transfer station's directory number stored thereat. Upon receipt of this transfer number, the originating register 6 calls in a completing marker 8, in the well-known fashion as fully detailed in the Busch patent. The called line directory information is transmitted from the register to the marker and the call is completed in the normal manner as described therein.

1.5 Recording the Calling Line Equipment Location for Billing Purposes

As was discussed previously, the transfer station preselected by the special service subscriber S1 is not limited to a local station. Accordingly, the need arises for a record of the call to be made for billing purposes. Under such a condition, the completing marker, in the manner fully detailed in the aforementioned Cahill et al. patent, causes the registration of the calling line equipment location together with other identification information in AMA equipment 10. However, prior to this registration, the memory 7, in the manner that will be apparent from that which is contained hereinafter, is interrogated and thus indicates that the equipment location currently registered in the marker is the equipment location of the B appearance of the auxiliary circuit. Accordingly, in the manner previously discussed, the memory provides the equipment location of the currently associated called line which is then substituted in the marker for the currently stored equipment location. The AMA equipment thereupon processes the call in the well-known manner so that for billing purposes it appears as though the special service customer at station S1 has placed the call.

1.6 Removing the Transfer Number from Memory

The special service subscriber may at any time resume the termination of incoming calls to the station by transmitting a preselected two-digit release code, in the manner set forth previously, to an originating register. For purposes of illustration, it is assumed that the release transfer code is 12. Therefore, upon transmission of the digits 1 and 2 from station S1, the originating register 6, in the manner to be more fully detailed hereinafter, causes the memory 7 to remove the transfer number currently associated with the equipment location of the special service subscriber. Immediately thereafter all incoming calls to transfer station S1 will be completed in the normal fashion as previously set forth.

2.0 Detailed Description

The following text will describe the embodiment of the invention in detail with reference to FIGS. 2 through 11. A cursory examination of these figures will reveal that certain relay contacts and relay designations have been enclosed in parentheses. The parenthetical symbol has been employed to facilitate a clear understanding of the invention by indicating that the apparatus which is enclosed therein is shown more fully in the earlier cited Busch disclosure. Relay designations and contact designations which are unique to the instant embodiment are not enclosed in parentheses and, as will be more apparent from that which is contained hereinafter, are shown in complete detail.

We shall assume as hereinbefore set forth that station S1 is arranged for temporary call transfer service. We shall further assume that the corresponding class of service designation is class of service 29. It will thus be obvious, as set forth in the Busch patent, that during the establishment of an originating or terminating connection involving station S1, marker circuit 8 will ascertain the class of service of station S1 to be that designated 29 and therefore will function in accordance with that class of service in processing such connections. In the immediately following detailed description, we shall assume that station S1 desires to have incoming calls transferred to some other telephone location as hereinbefore set forth.

2.1 Establishment of a Transfer Number in Memory

Thus, upon an off-hook condition of the subset at station S1, marker circuit 8 is seized by line link marker connecter 9 in a manner identical to that set forth in detail in the earlier cited Busch patent. Since marker circuit 8 is seized by line link marker connecter 9 only in conjunction with a dial tone request, maker circuit 8 prepares to obtain that information necessary for the completion of a dial tone connection.

Figure 2:
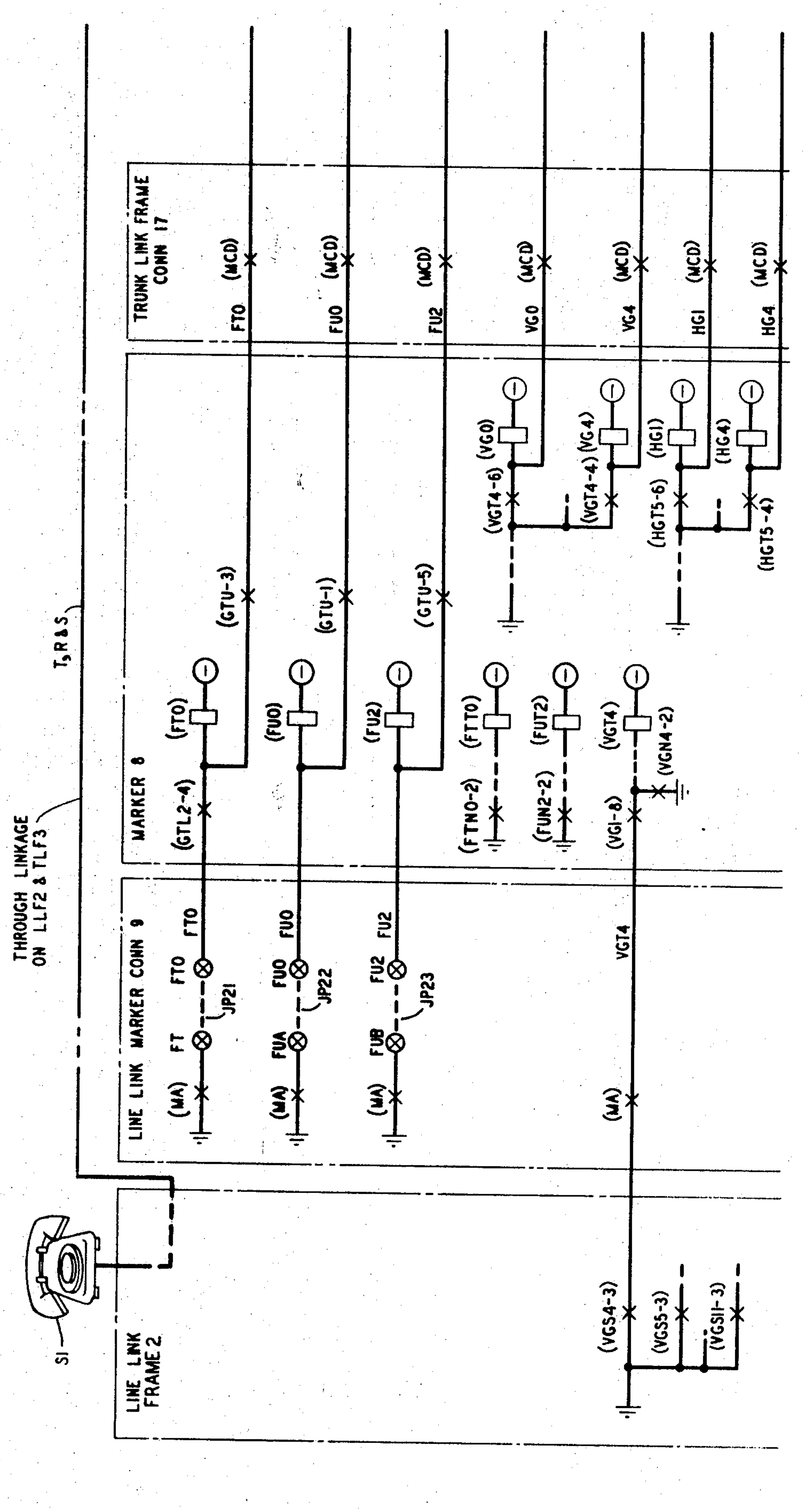
FIGS. 2 through 11 are schematic drawings showing in greater detail the interrelation of the components of the exemplary embodiment.
Figure 3:
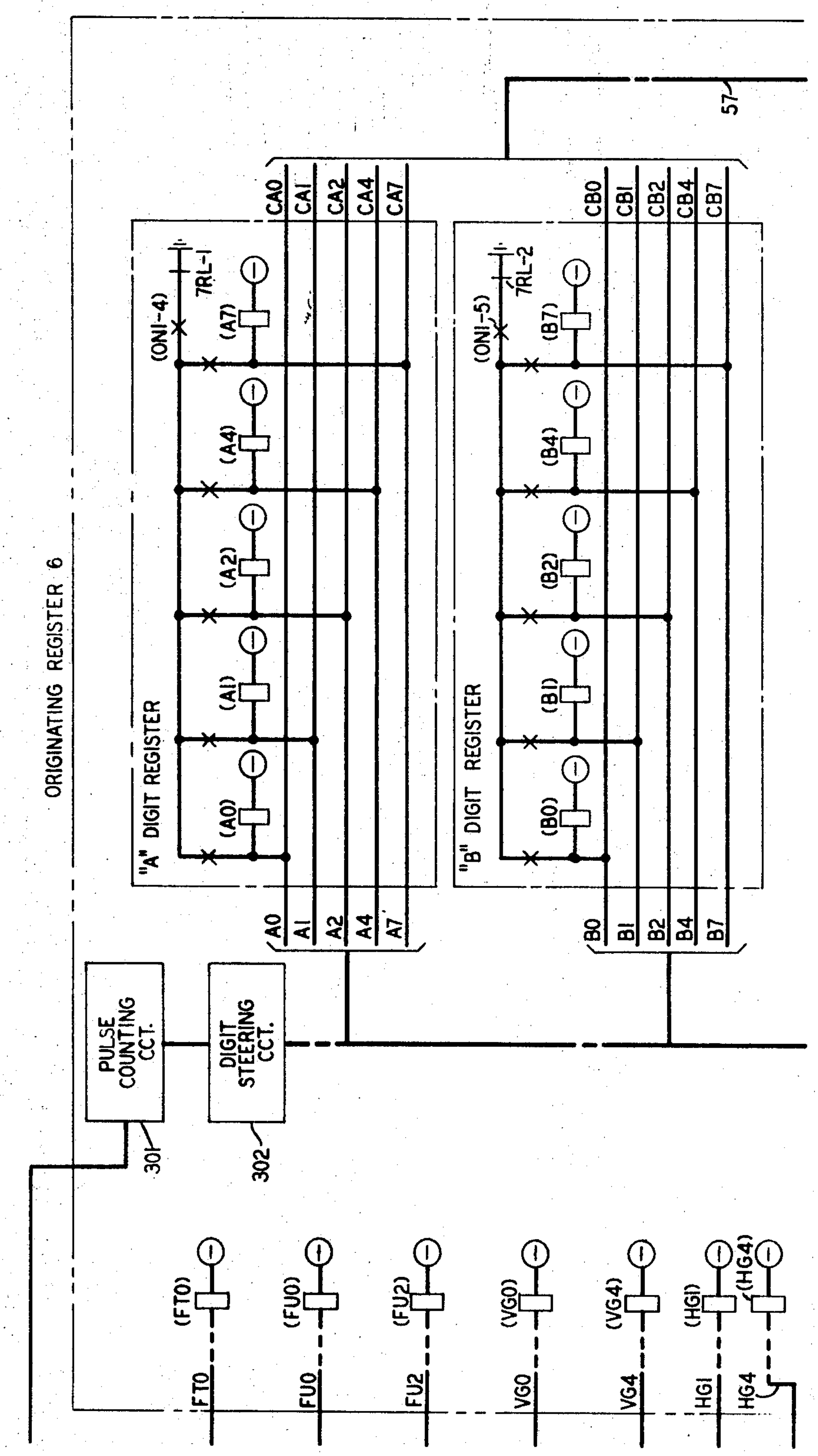
Figure 4:
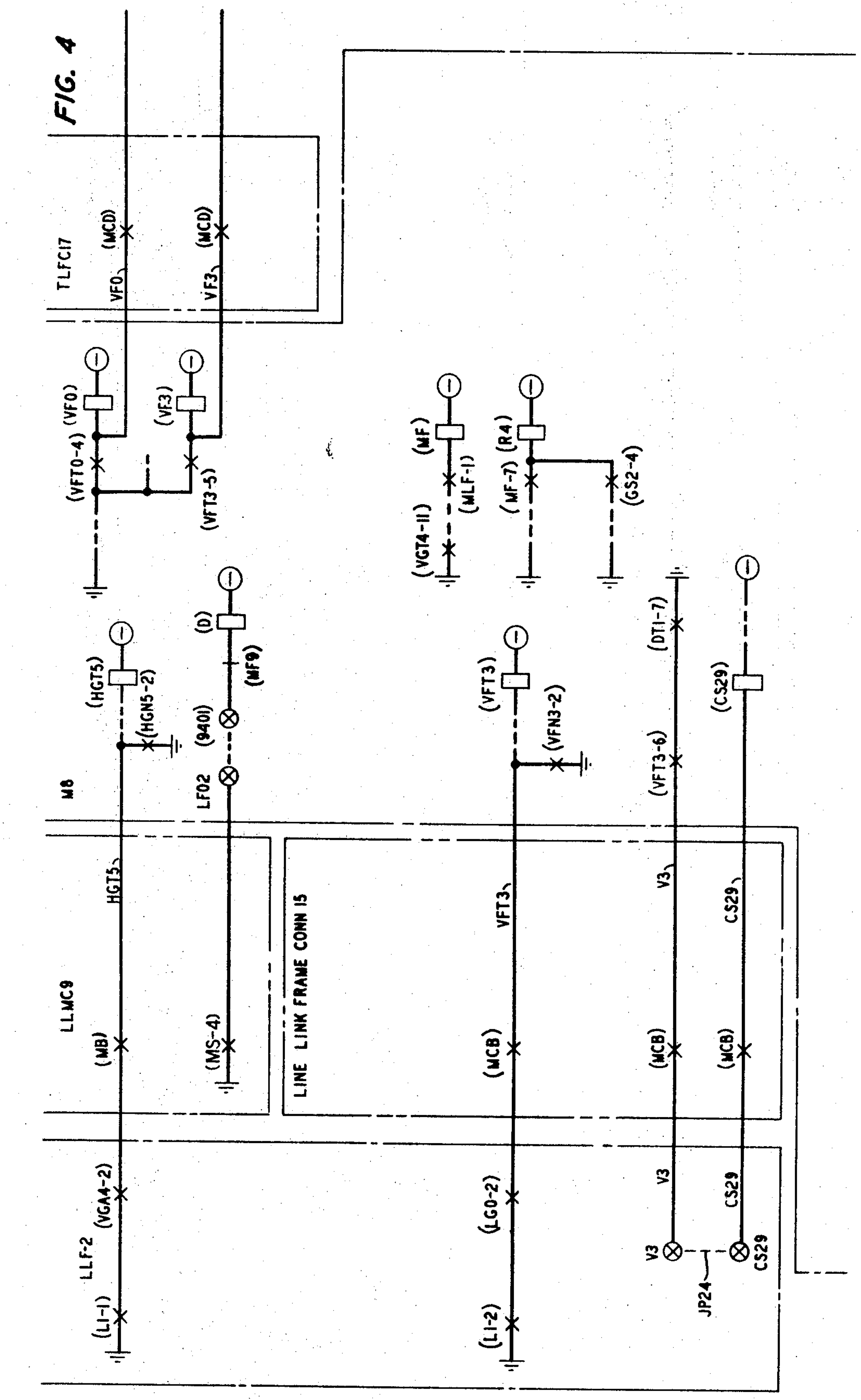

Referring now to FIGS. 2 and 4, line link marker connecter 9 extends various line location information leads to marker circuit 8 to permit registration of the information which identifies the location of the calling line. Accordingly, relay (FTO) in marker circuit 8 operates by an obvious circuit which extends via the (FTO) lead to ground in line link marker connecter 9, thus, recording a line link frame tens digit of 0. In similar fashion, relays (FUO) and (FU2) (frame units digit) operate from ground extended to the marker from line link marker connecter 9 thereby establishing that the origin of the connection is from a station located on line link frame 2.

In similar fashion, operated contacts on the (MA) relay in line link marker connecter 9 extend ground on the (VGT4) lead to marker circuit 8 to operate relay (VGT4), thereby identifying the vertical group location of the calling station as vertical group 4. Similarly, ground extended on the (HGT5) lead from line link marker connecter 9 identifies the station as being located in horizontal group 5 thus operating relay (HGT5). Concurrently therewith, the enabling of the marker start relay make contact (MS-4) extends ground from line link marker connecter 9 to the (LFO2) punching in marker circuit 8 to cause the operation of relay D by an obvious circuit. As discussed in detâil hereinafter, relay D indicates a request for the completion of a conventional dial tone connection.

As set forth in the A. J. Busch patent, upon receiving the aforesaid information, marker circuit 8 seizes line link frame 2 via the associated line link frame connecter which we shall assume to be line link frame connecter 15 as shown on FIG. 4. After the aforesaid seizure, operated line link frame connecter relay (MCB) extends those leads from line link frame 2 which are necessary to provide the vertical file location information of the calling station and also its preassigned class of service. Accordingly, at this time relay (VFT3) operates in marker circuit 8 from negative battery extended through the winding of the (VFT3) relay via the (VFT3) lead to line link frame connecter 15, enabled connecter relay (MCB), and through enabled make contacts (LGO-21) and (L1-2) to ground in line link frame 2.

As earlier noted, station S1 is preassigned class of service 29. Thus, the (CS29) relay operates in marker circuit 8 from negative battery extended through the (CS29) relay winding and via the correspondingly designated lead to line link frame connecter 15, enabled make contact (MCB) to the (CS29) punching in line link frame 2 via jumper JP24 to the V3 punching, and via the V3 lead through enabled make contacts of the (MCB) connecter relay in line link frame connecter 15, via the V3 lead to marker 8 and through enabled make contacts (VFT3-61) and (DT1-7) to ground.

Summarizing at this time, upon an off-hook condition of the subset at station S1, line link marker connecter 9 has enabled marker circuit 8 which, in turn, has seized line link frame 2 via line link frame connecter 15. Information identifying the line link frame, vertical group, horizontal group and vertical file has been recorded in marker circuit 8. In addition, relay (CS29) has operated in marker circuit 8 to identify the originating station as a station entitled to call transfer. The importance of this identification will be more fully appreciated from that which is contained hereinafter.

Figure 6:
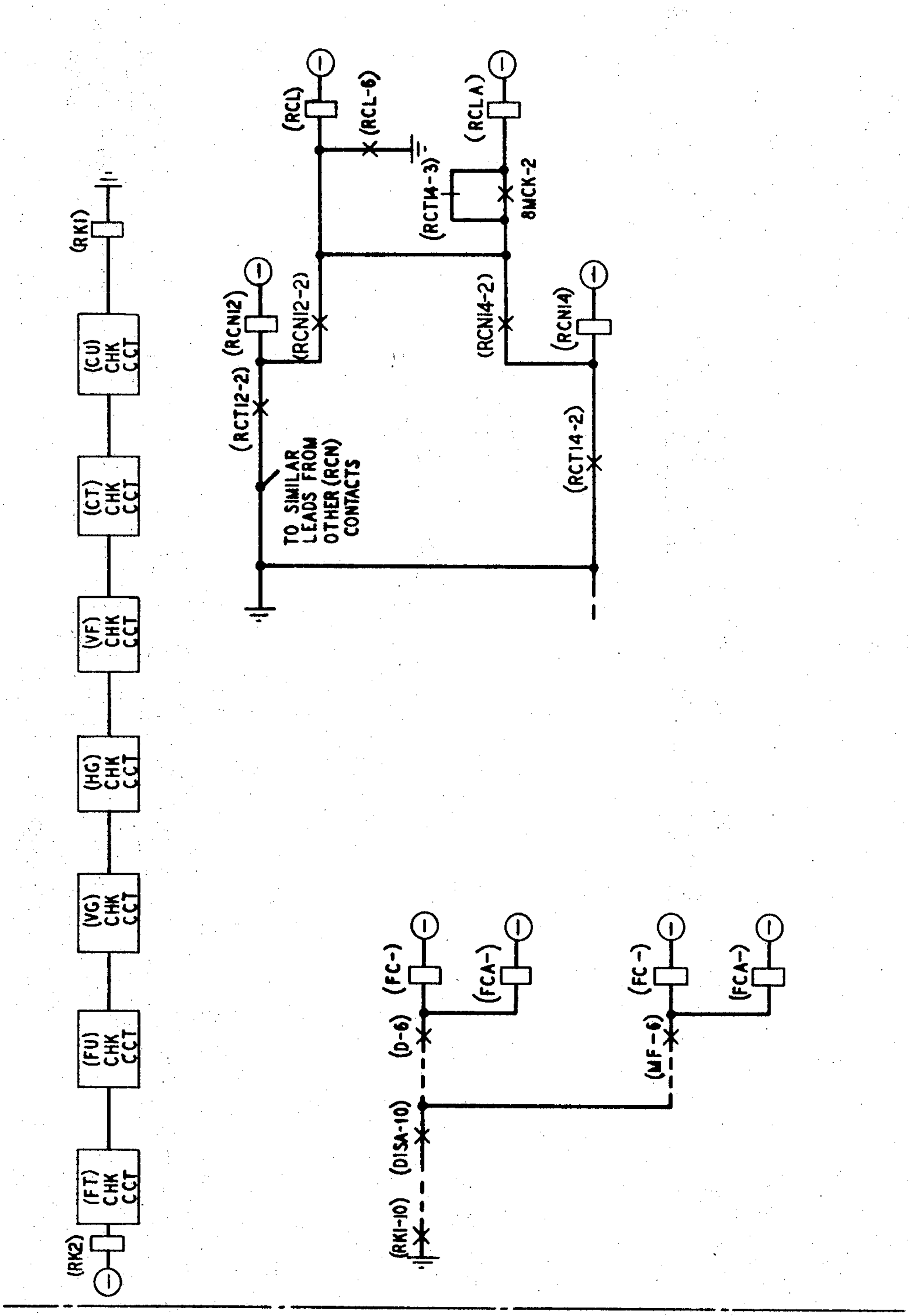

As show in FIG. 6 and as more fully described in the Busch patent, relays (RK1) and (RK2) operate at this time to indicate that the aforesaid line equipment location information and class of service information has been obtained. Thus relays (RK2) and (RK1) operate by an obvious circuit through the various check circuits to ground present on the winding of relay (RK1). Accordingly, operation of relay (RK1) enables the operation of relays (FC-) and (FCA-), FIG. 6, through enabled make contacts (RK1-10), (DISA-10) and (D-6). Relays (FC-) and (FCA-) are associated with trunk link frames which may be utilized in the requested dial tone connection. Thus, marker circuit operation proceeds in a manner identical to that set forth in the above-cited Busch patent for the establishment of a dial tone connection to an originating register.

Accordingly, marker circuit 8 proceeds to test for an available originating register. For purposes of the embodiment we shall assume that the marker seizes trunk link frame 3 so as to select originating register 6 at this time. Thus, as set forth in the Busch patent, connecter relay (MCD) operates in trunk link frame connecter 17, FIGS. 2 and 4, so as to accomplish the foregoing function and to extend a plurality of line location information leads and class of service indicating leads from marker circuit 8 to originating register 6. Thus, in the instant exemplary embodiment, the marker causes the operation of relays (FTO), (FUO), and (FU2) in originating register 6 to indicate the line link frame location of the calling station; and also the (VGO), (VG4), (HG4), and (VF3) leads to indicate the specific equipment location of station S1 on line link frame 2 as earlier recited in detail. The operate path of the foregoing identification relays are set forth in detail in the earlier cited Busch patent and are also obvious from an inspection of FIGS. 2 through 5 and thus will not be repeated in the text herein.

Concurrently with the transmission of the aforesaid line location information, the class of service information of station S1 is also transmitted by the marker. Since we have assumed that station S1 is classified as one of a group of stations designated as class of service 29, the marker will cause the operation of the appropriate class of service relays, which are not shown but are symbolically represented by class of service translator 701 in originating register 6, at FIG. 7.

Having recorded the aforesaid information, as well as other data pertinent to subsequent handling of the call, in originating register 6, marker 8 releases so as to be available to serve other calling connections. Prior to so releasing, marker 8 establishes a linkage connection from appearance R of station S1 on line link frame 2 to appearance X of originating register 6 on trunk link frame 3 in a manner identical to that set forth in the Busch patent. Thus, as shown on FIGS. 2 and 3, a continuous communication path extends from the subset at station S1 through to pulse counting circuit 301 in originating register 6. Dial tone is returned in the well known manner to signify that the calling station may commence transmission of the necessary digital information. We shall assume that the subscriber desires at this time to enable the transfer feature. We shall further assume that the subscriber has knowledge of the two digit code 11 which represents an identification to the originating register, in a manner to be more fully detailed hereinafter, that a transfer number is to be placed in memory.

As earlier set forth herein, we shall assume that the subscriber at station S1 generates the digits 1 and 1 in sequence as a manifestation of a request that station S1 thereafter be provided with the call transfer special service feature. The aforesaid two digits are counted in pulse counting circuit 301 and are extended through digit steering circuit 302 so as to be registered in the A digit register and the B digit register, respectively, in a manner identical to that set forth in the Busch patent. Accordingly, registration of a 1 in the A digit and a 1 in the B digit registers, respectively, of FIG. 3 will result in the grounding of leads CA0, CA1, CB0, CB1 in the well known two-out-of-five fashion. Concurrent therewith, relays 7CA0, 7CA1, 7CB0 and 7CB1 (FIG. 7) operate over an obvious path from the corresponding leads of the register relays, FIG. 3, via cable 57. These relays thereupon lock operated in an obvious manner and provide an operate path for the 7TT relay from battery through the winding of the relay, released break contact 7CB2-1, enabled make contacts 7CB1-1, 7CB0-3, 7CA1-1 and 7CA0-1, through class of service translator circuit 701, to ground. The translator circuit 701 may comprise any number of configurations well known in the art to provide continuity between two leads upon the registration and the transmission of a specified class of service; in this case class of service 29. Relay 7TT thereupon operates and prepares an operate path for relay 5T.

At this point, for simplicity of disclosure we shall assume that the subscriber has been informed that where a two-digit code is not followed by subsequent digits within a predetermined interval of time, such as, for example, 10 seconds, then the aforesaid code will be recognized as a transfer number storage request. We shall, therefore, assume that this interval of time transpires thus completing a circuit for the operation of relay 5T which extends from negative battery through the winding of relay 5T, released transfer contact 5T-1, released break contacts 5IH-2, enabled make contact 7TT-1 through interdigital timing circuit 501 which may comprise any number of configurations well known in the art operable to provide continuity between two leads after a predetermined time interval, and through two-out-of-five check circuits 502 and 503 which consist of a configuration of operated relay contacts on two of the five relays in the A digit register and two of the five relays in the B digit register, respectively, to ground. Thus, relay 5T operates at this time and locks operated through enabled transfer contact 5T-1 and enabled make contact (ON-8) to ground thereby manifesting to originating register 6 that a two-digit code has been transmitted which is recognized to be a request for transfer service.

Deviating momentarily, it will be noted that relay 5IH will be enabled in response to the operation of two-out-of-five of the registration relays in the C digit register. Were this to occur, enabled break contact 5IH-2 would thereby prevent the operation of relay 5T since the enabling of the C digit register indicates that the preceding A and B digits are not associated with a request for storage of a transfer number.

Figure 7:
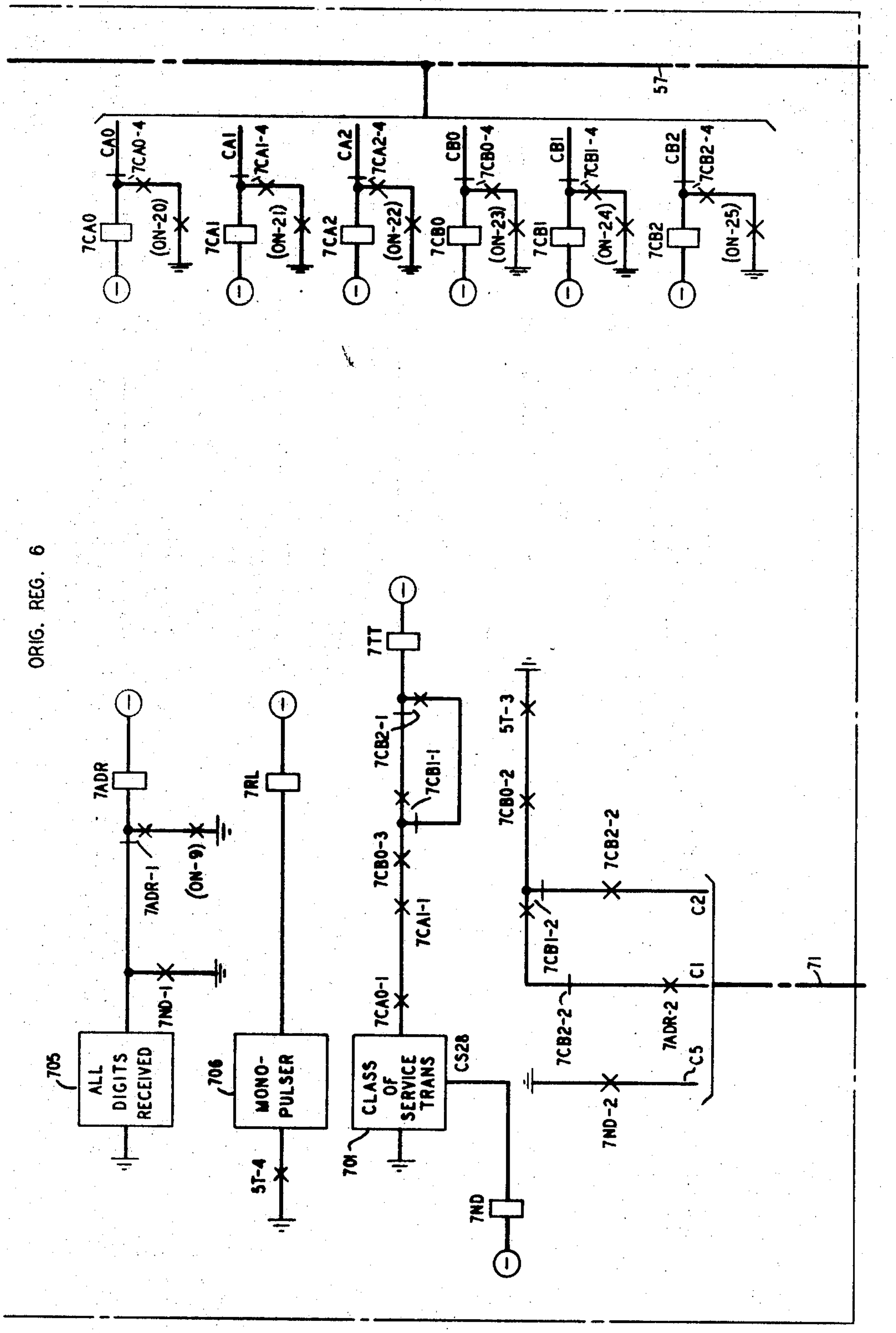

Referring now to FIG. 7, the enabling of make contact 5T-4 extends a ground to monopulser circuit 706 which may be anyone of a number of configurations well known in the art operable to provide at the output one current pulse for each application of ground at the input. Accordingly, relay 7RL momentarily operates and thereby causes the registration relays of registers A and B (FIG. 3) to release by momentarily removing the holding ground via enabled break contacts 7RL-1 and 7RL-2. The operation of relay 7RL also causes the digit steering circuit 302 of originating register 6 to recycle, in the well-known manner, and to again apply dial tone to the station S1.

As previously set forth, the subscriber then transmits the digits corresponding to the telephone directory number of the transfer station. These digits are stored in registers A through N, FIGS. 3 and 5, of originating register 6 in the well-known manner as fully detailed in the Busch patent. Accordingly, all digits received circuit 705, which may be advantageously arranged in any one of the well-known configurations to provide a ground at the output whenever the originating register has received all the dialed digits, operates relay 7ADR in an obvious fashion. The enabling of relay 7ADR extends a ground over lead C1 (FIG. 7) via enabled make contacts 5T-3, 7CB0-2 and 7CB1-2, released break contact 7CB2-2, and enabled make contact 7ADR-2 to memory circuit 7, input-output registers, FIG. 9, cable 71.

As noted earlier, it is intended that memory circuit 7 may comprise any one of a number of configurations of memory circuits well known in the art operable to electrically store information at a particular address location, which information may be obtained subsequently from that address location on a nondestructive readout basis.

Figure 9:
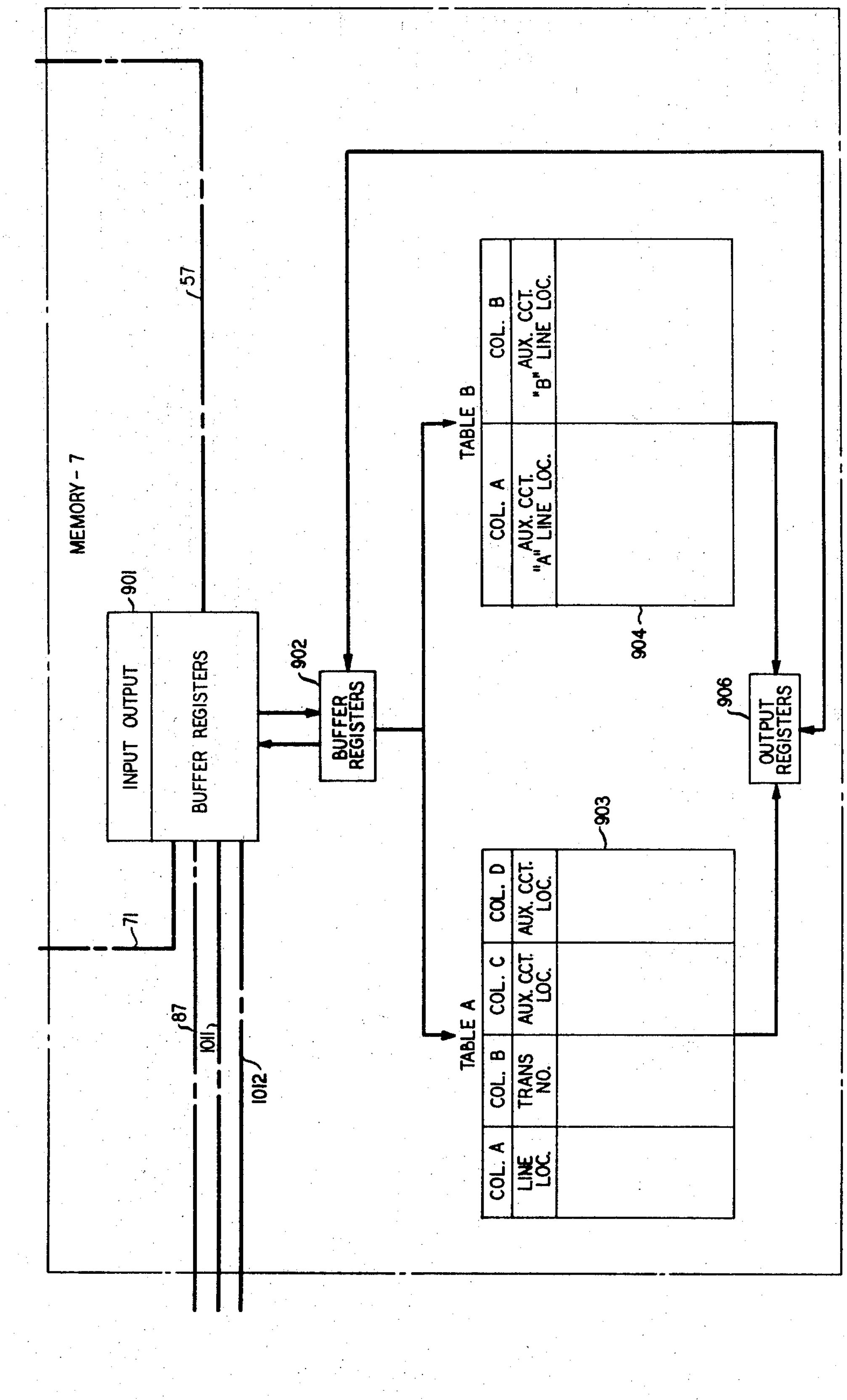

Turning now to FIG. 9, the aforesaid ground potential on cable 71, lead C1 indicates to memory 7, as well known in the art, that a write function is required. Concurrent with the enabling of the C1 lead, a plurality of leads are extended via cable 57 to address register 901 in memory circuit 7. An examination of the respective designations of these leads will reveal that they constitute two basic groups of information. The first group of information is the equipment location information of station S1 (as earlier recited this information will serve as an address for a specific location in memory); and the second group of information is the transfer directory number of the station to which calls are to be transferred. Thus, memory 7, FIG. 9, writes in table A903, column A, the equipment location of the called line and writes in column B, the transfer number associated with this location. The importance of this association will be more fully appreciated from that which is to follow.

It will be noted that the aforedescribed circuit action, after receipt of the transmitted digital information, takes place in an extremely brief interval of time since it is fully automatic in nature and does not depend upon any physical action on the part of the associated subscriber or maintenance personnel. We shall assume that the subscriber at station S1 now abandons the connection having recorded the transfer number for future use. It is, of course, obvious that numerous techniques well known in the art may be employed to transmit an audible signal to station S1 to indicate the completion of the aforesaid function in accordance with the subscriber's command.

Summarizing at this point, memory circuit 7 contains the transfer number to which subsequent incoming calls, which are directed toward station S1, are to be diverted. Outgoing calls originating from station S1, however, will not in any way be affected by such registration and accordingly will be completed through the switching network in the normal manner.

2.2 Incoming Call Diverted to Auxiliary Circuit

Assuming that an incoming call were to arrive via incoming trunk 4 as shown in FIG. 1, an incoming register will be attached to receive the called line directory number as set forth in detail in the Busch patent. As further described in detail in the Busch patent, a marker such as marker circuit 8 is thereupon seized and the calling line directory number is forwarded to the marker by the incoming register which thereupon releases. Since the marker is unable to complete a connection to a called line based merely upon a digital directory number, it is necessary for this directory number to be translated into physical equipment location information. As set forth in detail in the Busch patent, a number group circuit, such as number group 11, is seized by marker circuit 8 to translate this directory number information into the physical number equipment location of the called station in terms of line link frame number, vertical group number, horizontal group number, vertical file number and ringing combination. This information is thereupon registered in the corresponding marker registers 801.

As discussed in detail in the Busch patent, the ringing combination assigned to the called station may be utilized to also indicate a particular status such as two-party line service or PBX service. In the instant arrangement ringing combination 14, as manifested by operated relay (RCT 14) in FIG. 8, indicates to the marker that the called station is a special service station requiring an interrogation of memory 7 to determine whether the call should be completed in the normal manner or diverted instead to a transfer location.

Figure 8:
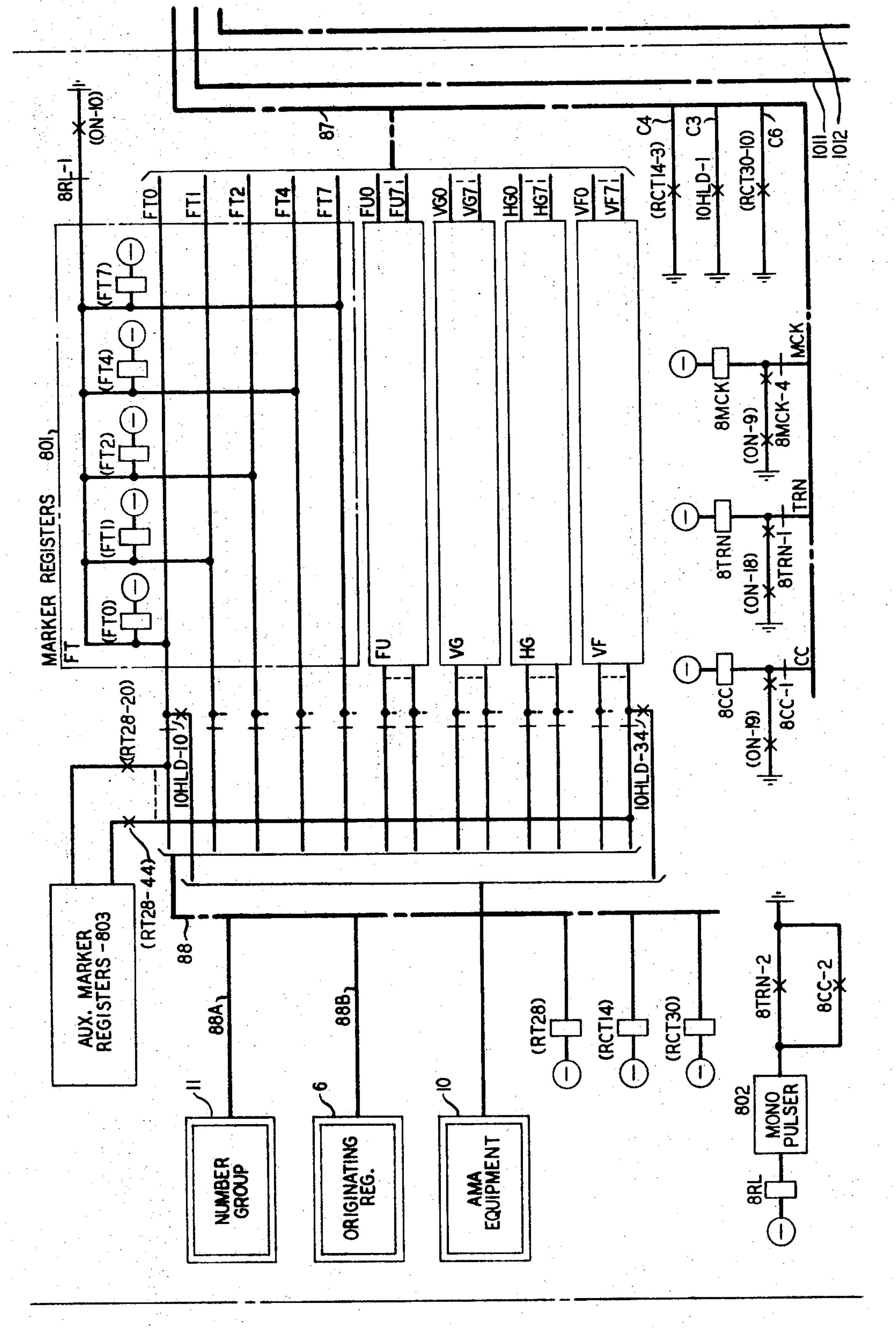

Referring now to FIG. 8, the enabling of make contact (RCT14-3) provides a ground on lead C4, via cable 87, to memory 7, FIG. 9. Memory 7 is arranged, in the well-known manner, to initiate an interrogate function whenever the C4 lead is grounded. The memory thereupon obtains the equipment location numbers currently contained in marker registers 801, via cable 87, as an address for interrogation purposes. Upon ascertaining that a transfer number is in fact registered in the memory corresponding to the equipment location of the called line, the memory causes the operation of relay 8TRN via cable 87, FIG. 8. Relay 8TRN operating, locks operated to enabled make contact (ON-18) and also provides a ground via enabled make contact 8TRN-2 to monopulser circuit 802, thereby momentarily operating relay 8RL in the manner previously discussed for relay 7RL. Accordingly, the momentary operation of break contact 8RL-1 removes the holding ground for each of the operated marker register relays 801, thereby releasing the previously stored line equipment location information which had been contained therein.

Figures 10, 12:
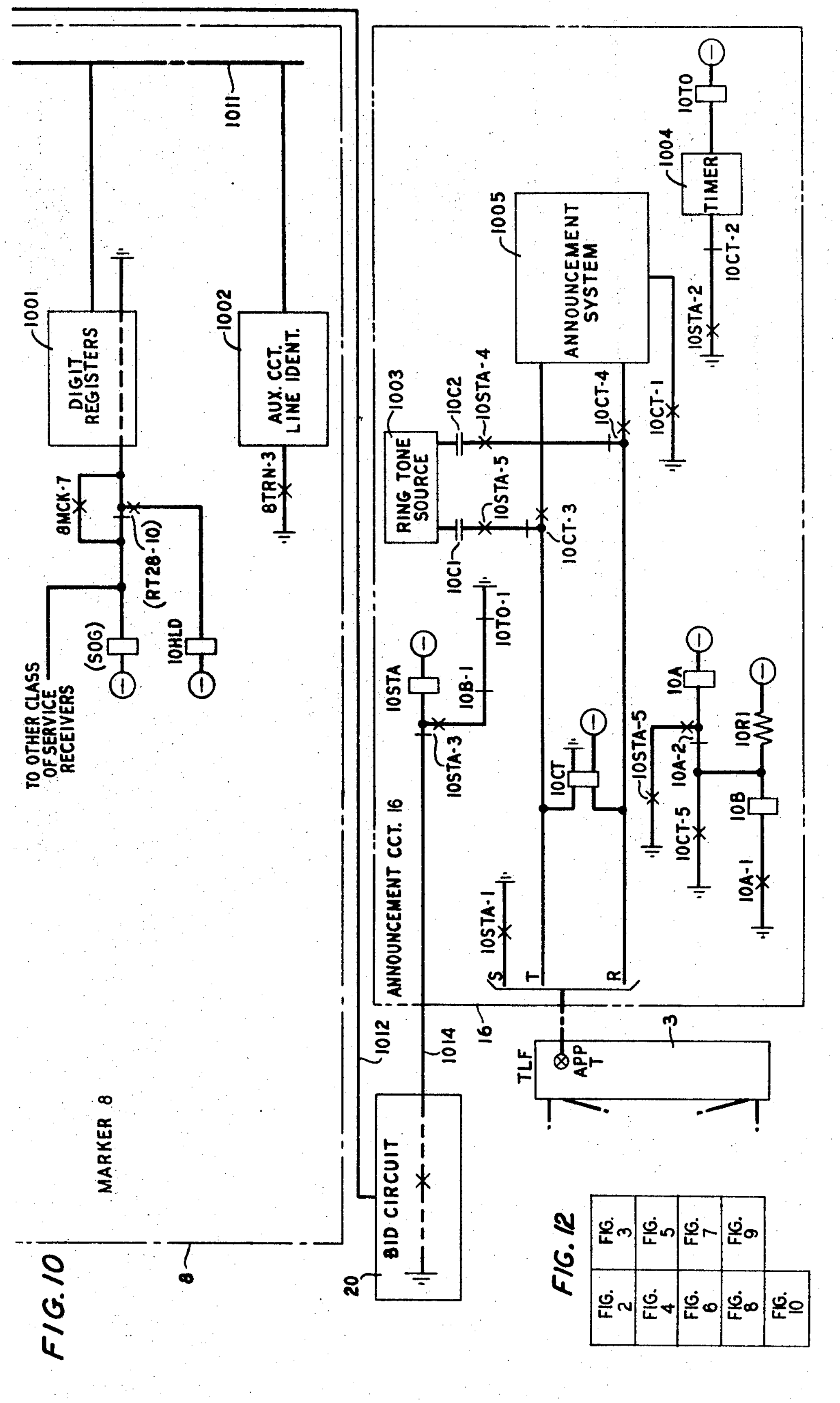
FIG. 12 shows the manner in which the other figures should be arranged.

Turning now to FIG. 10, the operation of relay 8TRN also provides a ground, via enabled make contact 8TRN-3, FIG. 10, to auxiliary circuit line identifier 1002 which is operative, in the well-known manner, to cause the marker to hunt for an idle call transfer switching circuit. The equipment location identification numbers of the A line link frame appearance of the selected transfer circuit are stored therein and transferred to memory 7, via cable 1011. Memory 7 is arranged to accept this equipment location and to write the information in the well known manner in table A903, column C (FIG. 9) at the physical location addressed by the originally called line equipment number. Concurrently therewith, memory 7 transfers this equipment number to the marker register 801, FIG. 8, via cable 87. The marker 8 now contains all the information necessary to complete the incoming call to the A line appearance of the selected auxiliary switching circuit.

Returning now to FIG. 8, memory 7 thereupon causes the operation of relay 8MCK via an obvious path, over cable 87. Relay 8MCK operating, locks operated to enabled make contact (ON-9) and enables the marker to continue processing the call, as will be seen from that which is to follow.

Turning now to FIG. 6, as set forth in detail in the Busch patent, the operation of relay (RCLA) manifests a check of the successful reception of the ringing combination information from the number group. In the instant arrangement the operation of relay (RCLA) is delayed until the enabling of make contact 8MCK-2. Operation of the 8MCK relay, as set forth above, thereby completes an operate path for relay (R-CLA) from ground through enabled make contacts (RC14-2), (RCN14-2) and 8MCK-2 which enables the completion of the call to the equipment location number now contained within marker registers 801.

Digressing momentarily, the failure of memory 7 to indicate that a transfer number is presently stored therein corresponding to the equipment location of a called line results in the operation of relay 8MCK, in the manner set forth above, thereby allowing the call to be processed to completion in the normal manner to the called station S1.

Summarizing at this point, the called line equipment location information which had been received from the number group has been erased from the marker registration relays and has been replaced with the line equipment location of switching circuit 12, appearance A. The line equipment location of appearance A has also now been stored in memory at an address corresponding to the originally called line equipment location.

In the manner set forth in detail in the Busch patent, a linkage connection is thereupon completed from appearance W, FIG. 1, of incoming trunk 4 to appearance A of switching circuit 12. The marker releases at this point and ringing tone is transmitted, in the well-known manner, from incoming trunk 4 to the A appearance of switching circuit 12.

2.3 Audible Announcement to the Called Line

In accordance with another aspect of my invention, memory 7 upon recording the A line appearance of a switching circuit is arranged to provide a signal over cable 1012 to bid circuit 20, FIG. 10. Upon receipt of this signal, the bid circuit, which may be any one of numerous circuits well-known in the art operable to select an idle circuit from among a group of such circuits, provides a ground on lead ST via cable 1014 to the selected announcement circuit, which in this case is announcement circuit 16, FIG. 10. Accordingly, ground on lead ST enables the operation of relay 10STA. Relay 10STA locks operated via enabled make contacts 10STA-3 and released break contacts 10B-1 and 10TO-1 to ground. Since the announcement circuit is connected to the trunk link frame in the same manner as an incoming trunk, the enabling of make contact 10STA-1 causes the attachment of an idle marker, such as marker 8, to the announcement circuit in the well-known manner. The class of service assigned to the announcement circuit, such as class of service 80, enables the operation of relay (RCT30) of FIG. 8, which in turn provides a ground on lead C6, cable 87, to memory 7 as an indication that the line equipment number of the originally called line must be provided to the marker. The marker stores this equipment number, as received from memory 7 via cable 87, in marker registers 801 and thereupon establishes a linkage connection through the switching network to the originally called line. The marker then releases and ringing tone is applied to the called line from ringing tone source 1003, which may be any one of numerous circuit arrangements well known in the art operable to provide cyclical ringing potential on a pair of wires, via capacitors 10C1 and 10C2, enabled make contacts 10STA-4 and 10STA-5, released break contacts 10CT-3 and 10CT-4 and via the T and R conductors through the switching network to the called station S1. Relay 10STA in operating also starts timer circuit 1004 which, as well known in the art, is operable after a predetermined timed interval to enable relay 10TO.

Station S1 going off-hook in response to the ringing tone applied enables the operation of relay 10CT in the normal manner via the now closed subscriber loop. Accordingly, ring tone is removed from the connection by transfer contacts 10CT-3 and 10CT-4 which in turn connect announcement system 1005 to the subscriber loop. Announcement system 1005 may be any one of the well-known systems operable to provide a predetermined audible announcement. The enabling of relay 10CT enables the announcement system via round ground from enabled make contact 10CT-1, in addition to enabling the operation of relay 10A from ground through enabled make contact 10CT-5 and released break contact 10A-2 to battery through the winding of relay 10A. Relay 10A thereupon locks operated via enabled make contacts 10A-2 and 10STA-5 to ground. Relay 10B is held normal at this time by a shunt ground from enabled make contact 10CT-5 to the winding side of resistor 10R1. In addition, operation of relay 10CT inhibits the operation of timer 1004, in the well-known manner, by removing ground therefrom via enabled break contact 10CT-2. It should be noted that when relay 10CT does not operate within the predetermined timed interval relay 10TO operates, thereby releasing relay 10STA, via enabled break contact 10TO-1.

Subscriber S1, upon going off-hook within the timed interval, receives an announcement from the auxiliary announcement circuit such as, "In accordance with prior instructions, an incoming call is currently in the process of being transferred". It should be noted that subscriber S1 may ascertain the identity of the transfer station by initiating a call to his own station. As set forth in Busch, an intraoffice trunk would become associated with the calling line S1 and a marker would attempt to complete the call to station S1. In the normal situation, busy tone would be returned to the subscriber. However, when the call transfer feature is activated, the marker directs the intraoffice trunk, in the same manner as an incoming trunk, to become associated with an idle switching circuit. The call is then completed in the manner to be more fully detailed hereinafter to the transfer station.

Subscriber S1 going on-hook causes the subscriber loop to open, in the well-known manner, thereby releasing relay 10CT. Accordingly, shunt ground is removed from relay 10B via released make contact 10CT-5, thereby providing an operate path from ground through enabled make contact 10A-1, the winding of relay 10B and through resistor 10R1 to battery. Relay 10B operating enables the release of relay 10STA via enabled break contact 10B-1. The release of relay 10STA releases via released break contact 10STA-1 the linkage through the switching network, in the well-known manner, from announcement circuit 16 to station S1.

Summarizing momentarily at this point, upon the diversion of an incoming call from the originally called station to an auxiliary transfer circuit, an announcement is provided to the called station as an indication that calls are currently being diverted. Included within this announcement to the called station is the directory number of the station to which calls are currently being transferred.

2.4 Completion of a Call From the Auxiliary Circuit to the Transfer Station

Figure 11:
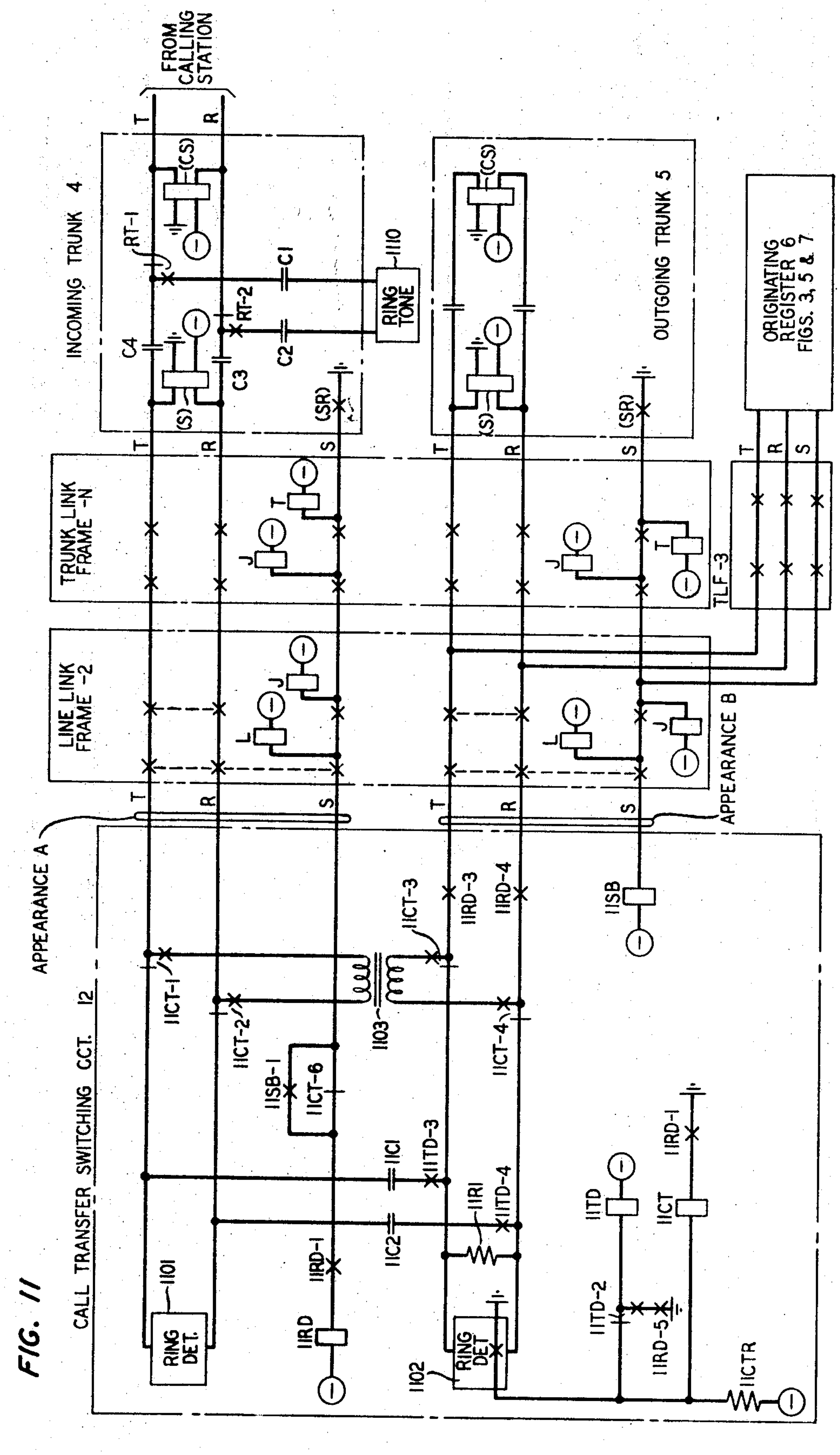

As previously set forth, upon establishment of a linkage from the incoming trunk to the auxiliary circuit, ringing tone is applied to the line. Referring now to FIG. 11, ringing potential on conductors T and R of appearance A of switching circuit 12 enables ringing detector 1101 which may comprise any one of a number of circuit configurations well known in the art operable to detect ringing voltage impressed upon the T and R conductors. Accordingly, relay 11RD is enabled by ground extended through the detection circuit, released break contact 11RD-1 and the winding of the 11RD relay to battery. It should be noted at this point that the detection circuit 1101 is arranged in the well-known manner to trip ringing without causing the automatic charging equipment to begin the billing process.

Relay 11RD operating, locks operated over its own make contact 11RD-1, released break contact 11CT-6 and the switching ground extended through the switching network via lead S. The operation of relay 11RD also provides a low impedance path between conductors T and R of appearance B via enabled make contact 11RD-3, released break contact 11CT-3, resistor 11R1, released break contact 11CT-4 and enabled make contact 11RD-4. Marker circuit 8 is thereby signalled, in the manner previously discussed and as detailed in the Busch patent, to provide a linkage from appearance B on line link frame 2, FIG. 1, to an appearance X on trunk link frame 3, thereby connecting the switching circuit 12 to originating register 6. In the manner previously set forth, marker circuit 8 determines the class of service assigned to switching circuit 12, which we shall assume in this case to be class of service 28. The marker thereupon transfers this class of service number, together with the line equipment location number of appearance B of transfer switching center 12, to the originating register in the manner previously set forth.

Digressing momentarily, it should be pointed out that since the originating register 6 is now connected to appearance B, the directory number associated with the call cannot be transferred in the normal fashion from the switching circuit. The originating register must instead interrogate the memory at the address location of the called line for the directory number contained thereat. However, originating register 6 at this time only contains the equipment location of appearance B of the switching circuit and therefore, in the manner detailed hereinafter, relies upon memory 7 for the proper correlation between these address numbers.

Referring now to FIG. 7, class of service translator 701 is arranged in the well-known manner to detect class of service 28 and to thus operate relay 7ND in an obvious manner via lead CS28. Accordingly, relay 7ADR is thereby also operated in an obvious manner as an indication to the originating register that digits will not be received from the linkage connection. The operation of relay 7ND also provides a ground via lead C5 to memory 7 as an indication, in the well-known manner, that information is available via cable 57 from the register equipment location number relays.

Referring now to FIG. 9, memory 7, upon receipt of ground on lead C5, and the digital information indicating the line location of the B appearance of switching circuit 12 is arranged to search column B of table B904 for the corresponding auxiliary circuit A appearance line location. The memory thereupon utilizes the auxiliary circuit A line location, as obtained from column A, to locate, in the well-known manner, the currently associated transfer number from column B of table A903. The correlated transfer number is thereupon read out of memory table A, column B and transmitted via cable 57, to the A to N registers, FIGS. 3 and 5. Upon receipt of this transfer number the originating register calls in a completing marker, in the well-known fashion, as fully detailed in the Busch patent, and the call is completed in the normal manner as described therein.

2.5 Recording the Calling Line Equipment Location for Billing Purposes

As was discussed previously, the transfer station preselected by the special service subscriber S1 was not limited to a local station. Accordingly, when the originating register calls in a completing marker, the class of service 28 causes the operation of relay (RT28) in FIG. 8 of the marker circuit. Concurrent with this operation, the originating register also enables the marker to record in registers 1001 (FIG. 10) the directory number of the transfer station. Accordingly, the marker, in the well-known fashion, enables the automatic message accounting (AWA) equipment for billing purposes by extending a ground from digit register 1001 (FIG. 10) to relay (SOG). However, since class of service code 28 has been received, the (RT28) relay operates thereby enabling the operation of relay 10HLD via enabled transfer contact (RT28-10). Transfer contact (RT28-10) also inhibits the operation of relay (SOG) which prevents the enabling of the AMA equipment at this time. In the interval between the operation of relay (RT28) and relay 10HLD, all the input leads to marker register 801 are connected through the associated released break contact of relay 10HLD (FIG. 8) to the corresponding leads of auxiliary marker register 803.

Referring now to FIG. 8, the operation of relay 10HLD provides a ground via lead C3 and enabled make contact 10HLD-1 to memory 7 via cable 87. Ground on lead C3 indicates to memory 7 that a correlation again must be made to determine the called line equipment location, in the manner set forth previously. The memory 7 thereupon enables the operation of relay 8CC, via cable 87, thereby enabling monopulser 802 in the manner previously set forth. Accordingly, relay 8RL is momentarily operated and releases the operated equipment location register relays in marker register 801, in the manner previously set forth. Memory 7 thereafter transfers to the marker register 801 the equipment location number of the called line currently associated with appearance B of call transfer switching circuit 12. Memory 7 also enables the operation of relay 8MCK at this time, in the manner previously discussed, thereby allowing the operation of relay (SOG), FIG. 10, via enabled make contact 8MCK-7. Relay (SOG) operating allows the marker to continue processing the call in the normal manner, as set forth in the Busch patent. The AMA equipment thereupon records the originally called line information as contained in marker register 801 in the well-known manner so that for billing purposes it appears as though the special service customer at station S1 has placed the call.

It should be noted at this point that since the calling line appearance, which is the B appearance of the switching circuit, was transferred to auxiliary register 803 prior to being erased from the main marker register 801, the linkage connection through the switching network is established to the calling line while the AMA equipment records the originally called line. It should also be noted that the association between the called line and the selected auxiliary transfer circuit is no longer necessary and therefore the memory is arranged to remove the associated entry from table A column C in memory 7.

2.6 Establishment of a Talking Path From the Calling Station to the Transfer Station Referring again to FIG. 11, the marker attaches an outgoing trunk to the linkage from switching circuit 12, appearance B, in the manner set forth in the Busch patent, in order to complete the call. Accordingly, relay (SR) therein returns supervisory ground over the S lead in order to maintain the linkage switches in an operated position. Relay 11SB in switching circuit 12 is accordingly held operated from this ground as an indication to the transfer circuit that a connection forward is currently being processed.

Upon completing the call forward the marker at the terminating end in the well-known manner sets ringing potential to the called transfer station's line. Ringing tone is then transmitted back over the talking connection via the T and R conductors to the B appearance of the switching network and through enabled make contacts 11RD-3 and 11RD-4, released break contacts 11CT-3 and enabled make contacts 11CT-4, 11TD3, 11TD4, capacitor 11C1 and 11C2 released break contacts 11CT-1 and 11CT-2 to the T and R leads of appearance A, through the linkage connection to the calling subscriber via the incoming trunk 4. It will be remembered at this point that the original ringing potential applied by the incoming trunk to the A appearance of the switching circuit was tripped immediately and thus the calling subscriber has had no indication prior to this point that ringing had been started.

Returning now to FIG. 11, ringing detector 1102 in switching circuit 12 is arranged, in the manner well known in the art and as previously discussed, to detect ringing tone on the T and R conductors of appearance B and to thereupon connect ground via released break contact 11TD-2 through the winding of relay 11TD to battery. Accordingly, relay 11TD locks operated via enabled make contacts 11TD-2 and 11RD-5 to ground. Ringing detector 1102 also applies ground to the winding side of resister 11CTR, thereby maintaining relay 11CT in the normal condition.

When the transfer station goes off-hook ringing is tripped, in the well-known manner, thereby causing ringing detector 1102 to remove ground from the 11CTR resistor. Accordingly, an operate path for relay 11CT is provided from ground through enabled make contact 11TD-1, the winding of the relay to battery via resistor 11CTR. Accordingly, operation of relay 11CT connects the T and R conductors of the B appearance via inductor 1103 to the T and R conductors of the A appearance of the switching circuit. The calling station is thereby in telephonic communication with the transfer station through the switching circuit. At this time, inductor 1103 provides a low DC impedance via enabled make contacts 11CT-1 and 11CT-2 to the incoming trunk via the A appearance thereby enabling an answer entry, in the well-known manner, in the AMA equipment associated therewith.

It should be noted that upon the release of either the linkage of appearance A or the linkage of appearance B ground would be removed from the associated S conductor, thereby enabling the release of the switching circuit in the following manner. Removal of ground from conductor S of appearance B releases relay 11SB which thereupon releases relay 11RD by interrupting the holding ground via released make contact 11SB-1. Removal of ground from conductor S of appearance A also releases relay 11RD by removing the holding ground. Accordingly, relay 11RD, releasing, opens the T and R conductors of appearance B via released make contacts 11RD-3 and 11RD-4 and also removes the holding ground of relay 11TD via released make contact 11RD-5. Relay 11TD, releasing, releases relay 11CT in an obvious manner, thereby opening the T and R conductors of the A appearance via released make contacts 11CT-1 and 11CT-2. Accordingly, relay S in incoming trunk 4 releases which releases the switching circuit in the well-known manner. Since, as has been discussed previously, the association between switching circuit 12 and the called station has been erased from memory 7, the switching circuit again becomes available for subsequent calls directed to a station arranged for call forwarding.

2.7 Concurrent Transfer of Incoming Calls Directed to the Same Station

As previously discussed, under certain situations it is desirable to transfer all incoming calls to a transfer station having multiple answering facilities. In the usual situation, such a transfer station would be an answer bureau with multiple attendant positions. However, it should be noted that this feature is in no way limited to stations of this type, but may be employed with any transfer station.

Referring now to FIG. 9, it will be observed that table A903 is arranged with columns C and D, each of which may be utilized to store the equipment location of the A appearance of an associated switching circuit. Accordingly, the marker upon selecting an auxiliary circuit, after determining in the manner previously discussed that such a circuit is required, provides the equipment location of the selected circuit to the memory as previously detailed. The memory is arranged to only write addresses at this point and consequently if an auxiliary circuit number is currently stored in column C, memory 7 writes the new auxiliary circuit number in column D. The call then progresses to completion in the same manner as previously detailed. It is, of course, obvious at this point that any number of columns may be utilized for this purpose limited only to the physical size of the memory and to the traffic conditions. It should be remembered that in this regard the auxiliary circuit number is only retained in memory a limited time, since, as has been previously discussed, this number is removed from memory as soon as the call is completed from the B appearance of the switching circuit.

It should be noted that in an automatic switching system, such as set forth in Busch, many markers are arranged and are available for the establishment of switching connections. Accordingly, under these conditions it is possible for two or more calls, each directed to the same telephone station and each arriving at the same time, to be diverted to the transfer station independent of each other.

2.8 Removing the Transfer Number from Memory

The special service subscriber at station S1 may remove the transfer number from memory at any time and thus resume the termination of incoming calls to that station. As previously set forth, it is assumed that the release transfer code which must be transmitted by the subscriber for this purpose is "12". The subscriber's line, upon going off-hook, is connected, in the manner previously set forth, to an originating register, such as originating register 6.

Turning now to FIG. 7, upon receipt of the digits 1 and 2 from the subscriber relays 7CAO, 7CA1, 7CBO and 7CB2 operate in the manner previously set forth for the transfer activation code. Accordingly, class of service translator 701, in the manner previously set forth, enables ground via enabled make contacts 7CAO-1, 7CA1-1 and 7CBO-3, released break contact 7CB1-1 and enabled make contact 7CB2-1 through the winding of relay 7TT to battery. The operation of relay 7TT enables the operation of relay 5T in the manner previously set forth. The operation of relay 5T at this time enables ground from enabled make contacts 5T-3 and 7CBO-2, released break contact 7CB1-1 and enabled make contact 7CB2-2 over lead C2 to memory 7 via cable 71. Line equipment information is also transferred to the memory at this time via cable 57. The memory 7 is instructed thereupon to erase from table A903, column B, the transfer directory number associated therein with the equipment location number of the calling station. The calling station equipment location number is obtained, in the manner previously set forth, via cable 57 from the originating register which thereupon returns dial tone, in the well-known manner, to station S1 as an indication that the erase function has been completed. Incoming calls directed to station S1 will now be terminated thereto in the normal manner.

2.9 Conclusion

While the equipment of this invention has been shown in a particular embodiment wherein incoming calls to a privileged subscriber are diverted to an auxiliary switching circuit and independently completed to a transfer station, it is to be understood that such an embodiment is intended only to be illustrative of the present invention and that numerous other arrangements may be devised by those skilled in the art without departing from the spirit and scope of the invention.

For example, the invention may be used in a communication system for initiating a pattern of responses from a series of stations, each arranged for transfer service and mechanical announcements. For instance, assume that it is desired to enable a recorder at each one of a series of remote locations to simultaneously record certain data occurring thereat. Each such recorder may be associated with a particular telephone station and arranged to respond to a call directed to that station. The switching network servicing each of these stations may be arranged as in the instant invention for the attachment of an auxiliary circuit such as a recorder start circuit to the called line upon receipt of an incoming call directed thereto. Accordingly, the switching network may be further arranged to divert such an incoming call to the station associated with the next in the series of recorders while attaching the recorder start circuit to the called line. Accordingly, all recorders will be sequentially activated with the origination of a single call.

I claim:

1. In an automatic switching system:
a plurality of stations each having a single line appearance;
a plurality of line circuits each having a dual line appearance;
means for completing connections to any said line appearance; and
means controlled by one of said stations for inhibiting completion of incoming connections directed to said one station line appearance and for completing each inhibited connection exclusively to an available one of said dual line appearances.

2. The combination set forth in claim 1 further comprising means concurrently operable with the inhibiting of any of said connections directed to said one station and controlled by said one station for completing connections from said one station.

3. The combination set forth in claim 1 further comprising:
a plurality of auxiliary circuits; and
means responsive to the completion of said connection to said available dual line appearance for completing a connection from one of said auxiliary circuits to said one station.

4. In an automatic switching system:
a switching network;
a plurality of lines each having a single line appearance on said network;
a plurality of line circuits each having a pair of line appearances on said network;
means including memory means for establishing a connection through the pair of line appearances of one of said line circuits in place of a connection to one of said lines identified in said memory means; and
means independent of said line circuits for still establishing connections to said one line while said one line is identified in said memory means.

5. In a telephone system:
a switching network;
a plurality of lines each having a single line appearance on said network;
a plurality of line circuits each having a pair of line appearances on said network;
means for identifying a first line and for identifying a second line to which calls to said first line are to be transferred;
means responsive to a call to said first line and controlled by said identifying means for establishing a connection through said switching network to a line appearance of an idle one of said line circuits;
means for establishing a connection through said switching network from the other line appearance of said one line circuit to said second line; and
means concurrently operable with the enabling of said establishing means for completing connections involving said first line which connections are independent from said established connections.

6. In a telephone system, the combination set forth in claim 5 wherein said last mentioned means is controlled by said first line.

7. In a telephone system, the combination set forth in claim 5 wherein said last mentioned means includes auxiliary circuit means and means for establishing another connection from said auxiliary circuit means to said one line.

8. In a telephone system, the combination set forth in claim 7 wherein said auxiliary circuit means comprises announcement means operable upon connection to said one line for transmitting to said one line information previously stored therein.

9. In a telephone system, the combination set forth in claim 5 wherein said identifying means further includes means for identifying said second line while said first line is identified in said identifying means for the transfer of incoming calls to said first line.

10. In an automatic switching system:
a switching network;
a plurality of stations each assigned a unique designation connected to said network;
a plurality of switching circuits each having a pair of line appearances on said switching network;
a memory comprising a plurality of address locations each individually assigned to a corresponding one of said stations;
means controllable by a first station for storing in the corresponding memory address location a designation of another station to which calls to said first station are to be transferred; and
means responsive to a connection being directed to said first station for inhibiting said connection to said station and for establishing a connection through said switching network to a first line appearance of an idle one of said switching circuits whenever said memory address location of said first station contains the designation of a station to which calls are to be transferred.

11. The combination set forth in claim 10 wherein each said line appearance is assigned a unique equipment location designation:

means operable in response to a connection to said idle switching circuit for storing in said memory address location of said first line an equipment location designation of said first line appearance of said switching circuit;

means responsive to said establishment of a connection to said first line appearance of said switching circuit for originating an outgoing connection from said second appearance of said switching circuit;

means including said memory controlled by the equipment location designation of the second line appearance of said switching circuit for identifying said address location of said first station; and means controlled by said identifying means for completing said outgoing connection to said other station.

12. The combination set forth in claim 11 further comprising:

means for connecting an announcement circuit to said first station whenever a call to said first station is inhibited; and means for transmitting to said first station via said connected announcement circuit the designation of the said other station contained in said memory address location corresponding to said first station.

13. The combination set forth in claim 11 further comprising automatic message accounting equipment operable in response to the origination of a call from any line appearance for recording the designation exclusively associated therewith:

means controlled by said outgoing connection means for identifying the designation of said first station; and means for transmitting to said accounting equipment said first station designation.

PO-1050
(5/69)

UNITED STATES PATENT OFFICE
CERTIFICATE OF CORRECTION

Patent No. 3,544,729 Dated December 1, 1970

Inventor(s) T. R. Stevens

It is certified that error appears in the above-identified patent and that said Letters Patent are hereby corrected as shown below:

In the drawing, the two portions of FIG. 11 shown below should read as follows:

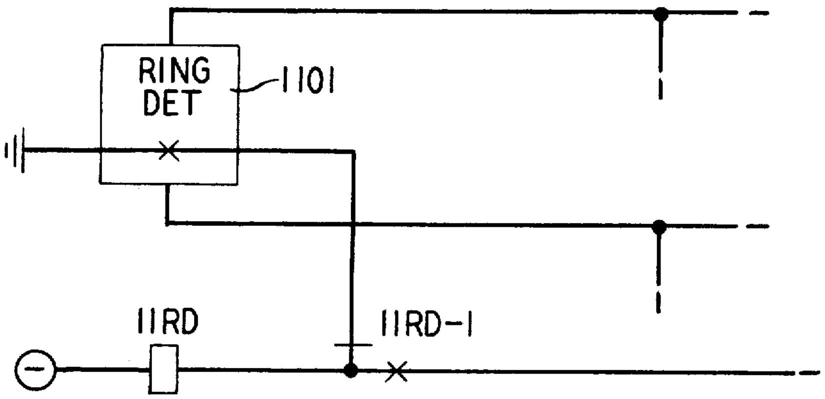

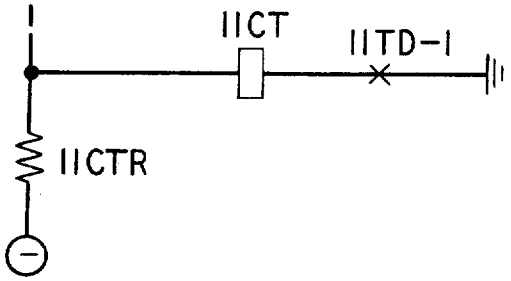

Signed and sealed this 2nd day of March 1971.

(SEAL)
Attest:

Edward M. Fletcher, Jr.
Attesting Officer

WILLIAM E. SCHUYLER,
Commissioner of Pate